US008909527B2

(12) United States Patent
Goffin et al.

(10) Patent No.: US 8,909,527 B2
(45) Date of Patent: Dec. 9, 2014

(54) LOW LATENCY REAL-TIME VOCAL TRACT LENGTH NORMALIZATION

(75) Inventors: Vincent Goffin, Summit, NJ (US); Andrej Ljolje, Morristown, NJ (US); Murat Saraclar, Jersey City, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 531 days.

(21) Appl. No.: 12/490,634

(22) Filed: Jun. 24, 2009

(65) Prior Publication Data
US 2009/0259465 A1 Oct. 15, 2009

Related U.S. Application Data

(63) Continuation of application No. 11/034,535, filed on Jan. 12, 2005, now Pat. No. 7,567,903.

(51) Int. Cl.
*G10L 15/12* (2006.01)
*G10L 15/06* (2013.01)
*G10L 15/02* (2006.01)

(52) U.S. Cl.
CPC ..................... *G10L 15/12* (2013.01)
USPC ............................ 704/241; 704/234; 704/200

(58) Field of Classification Search
USPC ................. 704/200, 211–218, 220, 231, 236, 704/241–245, 246–250, 270–271, 704/E17.001–E17.016, E11.001–E11.007; 379/88.01–88.28, 156–166, 207.01
See application file for complete search history.

(56) References Cited

U.S. PATENT DOCUMENTS

| 3,700,815 | A | * | 10/1972 | Doddington et al. | 704/246 |
|---|---|---|---|---|---|
| 4,297,528 | A | * | 10/1981 | Beno | 704/244 |
| 4,349,700 | A | * | 9/1982 | Pirz et al. | 704/241 |
| 4,712,242 | A | * | 12/1987 | Rajasekaran et al. | 704/253 |
| 4,763,278 | A | * | 8/1988 | Rajasekaran et al. | 704/251 |
| 4,827,516 | A | | 5/1989 | Tsukahara et al. | |
| 4,831,551 | A | * | 5/1989 | Schalk et al. | 704/233 |
| 4,852,172 | A | | 7/1989 | Taguchi | |
| 4,937,870 | A | * | 6/1990 | Bossemeyer, Jr. | 704/241 |
| 4,941,178 | A | * | 7/1990 | Chuang | 704/252 |
| 5,263,120 | A | * | 11/1993 | Bickel | 706/62 |
| 5,327,521 | A | * | 7/1994 | Savic et al. | 704/272 |
| 5,502,774 | A | * | 3/1996 | Bellegarda et al. | 382/159 |
| 5,696,878 | A | | 12/1997 | Ono | |
| 5,706,394 | A | * | 1/1998 | Wynn | 704/219 |
| 5,920,836 | A | * | 7/1999 | Gould et al. | 704/251 |
| 5,930,753 | A | | 7/1999 | Potamianos et al. | |
| 6,236,963 | B1 | | 5/2001 | Naito et al. | |
| 6,253,175 | B1 | | 6/2001 | Basu et al. | |
| 6,343,267 | B1 | | 1/2002 | Kuhn et al. | |
| 6,671,666 | B1 | * | 12/2003 | Ponting et al. | 704/233 |

(Continued)

*Primary Examiner* — Pierre-Louis Desir
*Assistant Examiner* — David Kovacek

(57) ABSTRACT

A method and system for training an automatic speech recognition system are provided. The method includes separating training data into speaker specific segments, and for each speaker specific segment, performing the following acts: generating spectral data, selecting a first warping factor and warping the spectral data, and comparing the warped spectral data with a speech model. The method also includes iteratively performing the steps of selecting another warping factor and generating another warped spectral data, comparing the other warped spectral data with the speech model, and if the other warping factor produces a closer match to the speech model, saving the other warping factor as the best warping factor for the speaker specific segment. The system includes modules configured to control a processor in the system to perform the steps of the method.

18 Claims, 9 Drawing Sheets

(56) References Cited

U.S. PATENT DOCUMENTS

| | | |
|---|---|---|
| 6,691,084 B2 * | 2/2004 | Manjunath et al. ........... 704/221 |
| 6,934,681 B1 | 8/2005 | Emori et al. |
| 7,120,582 B1 * | 10/2006 | Young et al. ................. 704/255 |
| 7,209,883 B2 * | 4/2007 | Nefian ........................... 704/256 |
| 7,328,154 B2 | 2/2008 | Mutel et al. |
| 7,386,443 B1 * | 6/2008 | Parthasarathy et al. ....... 704/201 |
| 7,467,087 B1 * | 12/2008 | Gillick et al. ................. 704/260 |
| 7,567,903 B1 * | 7/2009 | Goffin et al. .................. 704/261 |
| 7,761,296 B1 * | 7/2010 | Bakis et al. ................... 704/247 |
| 2001/0056349 A1 * | 12/2001 | St. John ......................... 704/270 |
| 2002/0035471 A1 * | 3/2002 | Breton ........................... 704/233 |
| 2002/0059068 A1 * | 5/2002 | Rose et al. .................... 704/246 |
| 2002/0082830 A1 | 6/2002 | Eide |
| 2002/0152069 A1 | 10/2002 | Gao et al. |
| 2003/0149803 A1 * | 8/2003 | Wilson ............................. 710/1 |
| 2003/0200087 A1 * | 10/2003 | Aronowitz .................... 704/241 |
| 2005/0060153 A1 * | 3/2005 | Gable et al. ................... 704/246 |
| 2005/0249272 A1 | 11/2005 | Kirkeby et al. |
| 2006/0047506 A1 | 3/2006 | Deng et al. |
| 2006/0074678 A1 * | 4/2006 | Pearson et al. ................ 704/267 |
| 2008/0059156 A1 * | 3/2008 | Han et al. ..................... 704/207 |
| 2009/0259465 A1 * | 10/2009 | Goffin et al. .................. 704/234 |
| 2010/0204985 A1 * | 8/2010 | Emori ........................... 704/210 |

* cited by examiner

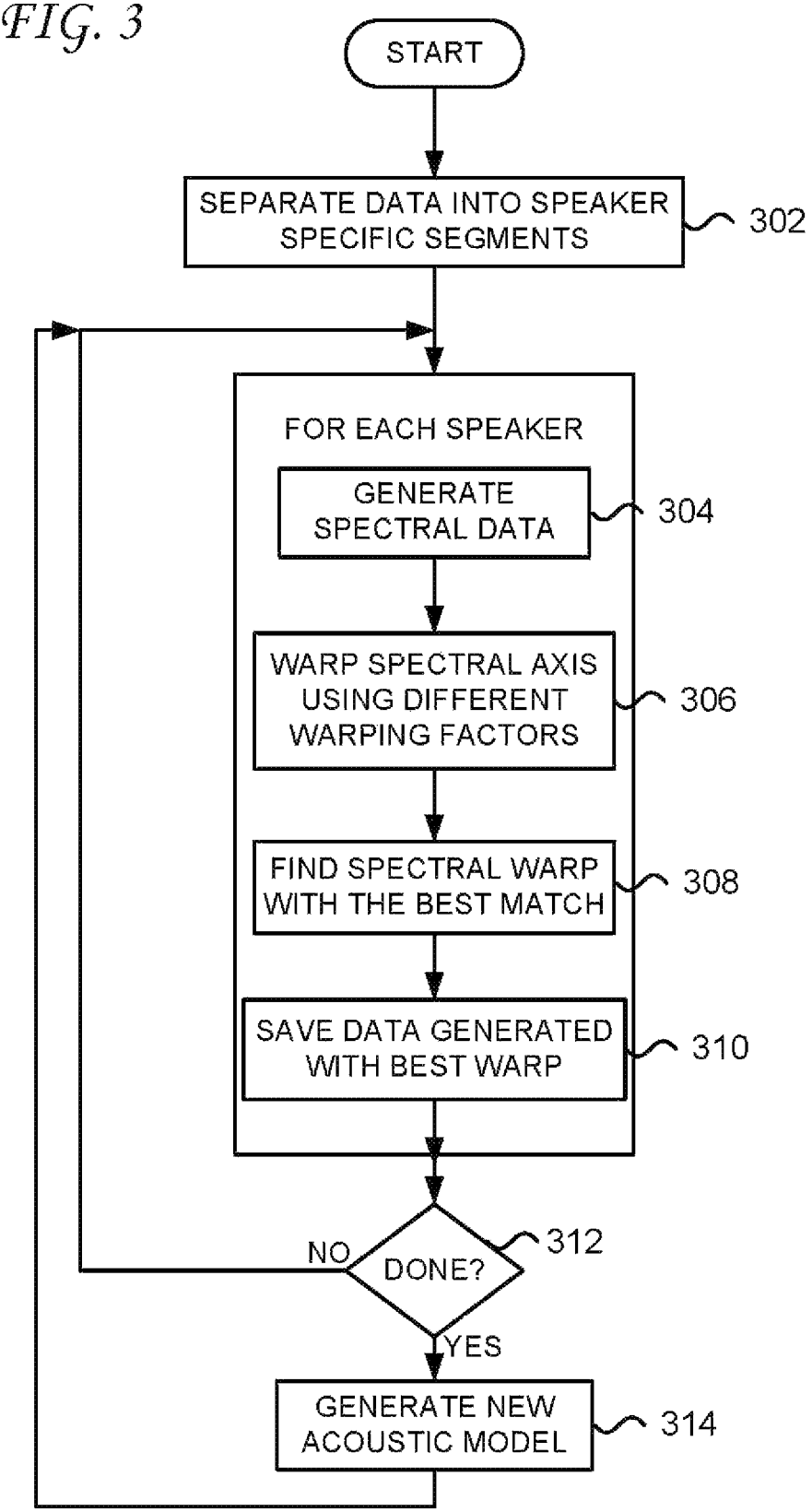

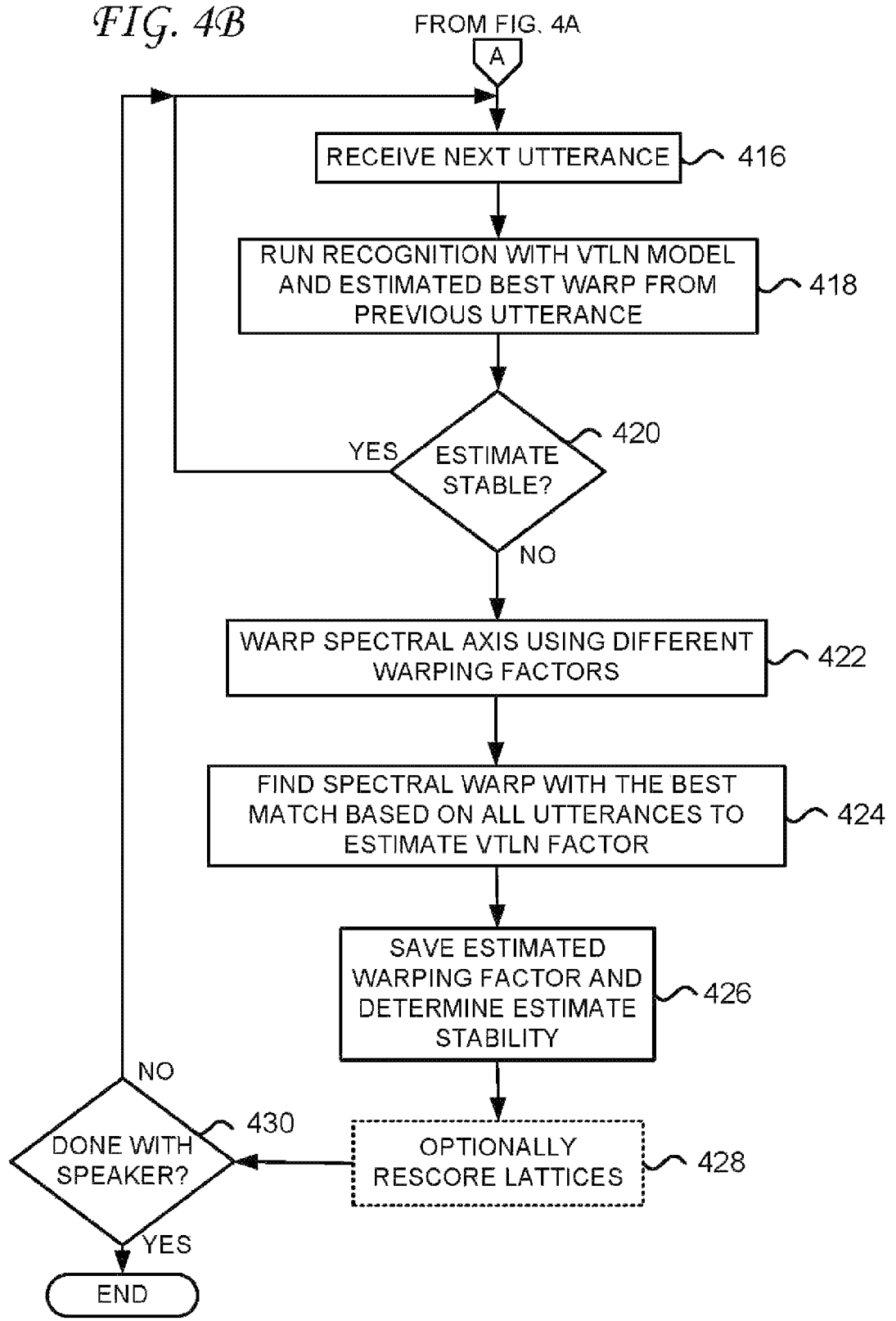

FIG. 5

| LENGTH [sec] | #WORD ERROR RATE [%] |
|---|---|
| no VTLN | 39.0 |
| 0.5 | 36.2 |
| 1.0 | 35.3 |
| 2.0 | 35.2 |
| 3.0 | 34.4 |
| all | 33.6 |

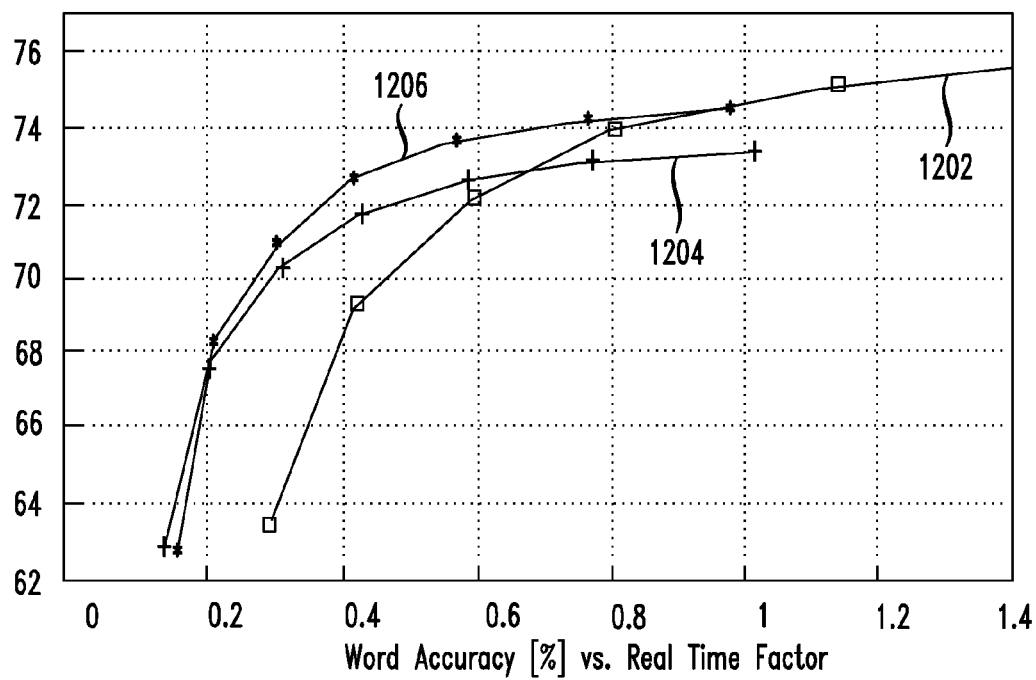

US 8,909,527 B2

LOW LATENCY REAL-TIME VOCAL TRACT LENGTH NORMALIZATION

PRIORITY INFORMATION

This application is a continuation application of U.S. patent application Ser. No. 11/034,535, filed on Jan. 12, 2005, the content of which is incorporated herein by reference in its entirety.

BACKGROUND OF THE INVENTION

1. Field of the Invention

The present invention relates to speech recognition and more specifically to vocal tract length normalization in real-time speech recognition.

2. Introduction

One of the fundamental difficulties with speech recognition is that different sound different, even when saying lexically identical utterances. Even casual observers find the differences between speakers drastic and much more pronounced than, for example, differences between separate utterances by the same speaker of the same string of words. Some of the inter-speaker difference can be attributed to simple acoustical properties of the human speech apparatus. Different people have different physical properties and thus their speech production organs also differ. If the speech generation process can be separated into a source and a channel, where the channel is a vocal tract, then any accounting for changes in the length of the vocal tract would greatly reduce the acoustic differences between different speakers. This would be true even if the differences in the shape of the vocal tracts are ignored.

Vocal Tract Length Normalization (VTLN) is a well established and successful technique for speaker normalization. VTLN attempts to normalize speech representation by removing differences caused by variations in the length of speakers' vocal tracts. A most popular way of achieving such normalization is by warping a frequency axis of a short term magnitude spectrum. This method can be applied during a recognition stage, but the improvements are roughly doubled if the same algorithm is also applied to training data before building an acoustic model. The most common implementation uses at least a few minutes of speech per speaker and the final result, even if the recognition was faster than real time, has significant latency.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a machine-implemented method is provided. The method includes generating a Vocal Tract Length Normalized acoustic model from training data, performing speech recognition on a first recognition input to determine a first best hypothesis, estimating a first Vocal Tract Length Normalization factor based on the first best hypothesis, performing speech recognition on a second recognition input, using the Vocal Tract Length Normalized acoustic model to determine an other best hypothesis, and estimating an other Vocal Tract Length Normalization factor based on the other best hypothesis and at least one previous best hypothesis.

In a second aspect of the invention, an apparatus for recognizing speech is provided. The apparatus includes storage configured to store data and instructions and a processor configured to execute the instructions in the storage. The processor is further configured to generate a Vocal Tract Length Normalized acoustic model from training data, perform speech recognition on a first recognition input using a baseline acoustic model to determine a best hypothesis, estimate a Vocal Tract Length Normalization factor based on the best hypothesis, perform speech recognition on a second recognition input, using the Vocal Tract Length Normalized acoustic model to determine an other best hypothesis, and estimate an other Vocal Tract Length Normalization factor based on the other best hypothesis and at least one previous best hypothesis.

In a third aspect of the invention, a machine-readable medium having instructions recorded thereon for a processor is provided. The instructions include instructions for generating a Vocal Tract Length Normalized acoustic model from training data, instructions for performing speech recognition on a first recognition input using a baseline acoustic model to determine a first best hypothesis, instructions for estimating a first Vocal Tract Length Normalization factor based on the first best hypothesis, instructions for performing speech recognition on a second recognition input using the Vocal Tract Length Normalized acoustic model to determine an other best hypothesis, and instructions for estimating an other Vocal Tract Length Normalization factor based on the other best hypothesis and at least one previous best hypothesis.

BRIEF DESCRIPTION OF THE DRAWINGS

In order to describe the manner in which the above-recited features and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 is a flowchart that explains an exemplary process that may be used in implementations consistent with the principles of the invention;

FIGS. 4A and 4B are flowcharts that help to explain another exemplary process that may be used in implementations consistent with the principles of the invention;

FIG. 5 is a table that illustrates word error rates resulting from a set of experiments; and FIGS. 6-12 are graphs that illustrate results of various sets of experiments.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
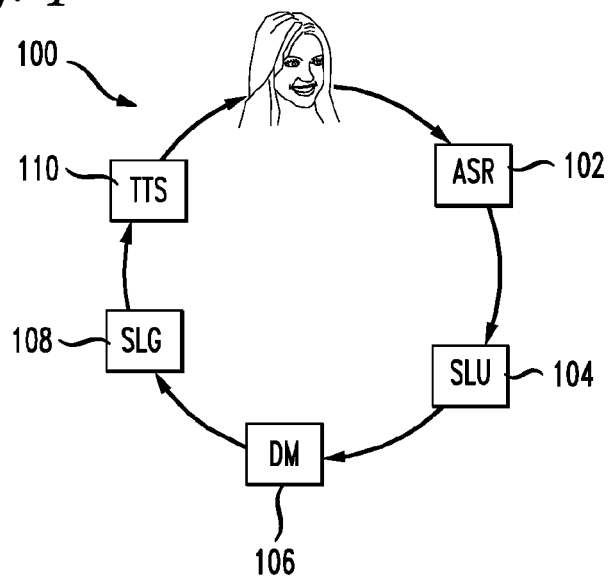
FIG. 1 illustrates an exemplary system consistent with the principles of the invention.

One example of a system that uses speech recognition is a natural language spoken dialog system. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110.

ASR module 102 may analyze speech input and may provide a transcription of the speech input as output. SLU module 104 may receive the transcribed input and may use a natural language understanding model to analyze the group of words that are included in the transcribed input to derive a meaning from the input. DM module 106 may receive the meaning of the speech input as input and may determine an action, such as, for example, providing a spoken response, based on the input. SLG module 108 may generate a transcription of one or more words in response to the action provided by DM 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

FIG. 1 is an example of only one type of system in which speech recognition may be used. Aspects of the invention are not limited to natural language spoken dialog systems. Other systems that use speech recognition are also included within the scope of the invention.

Figure 2:
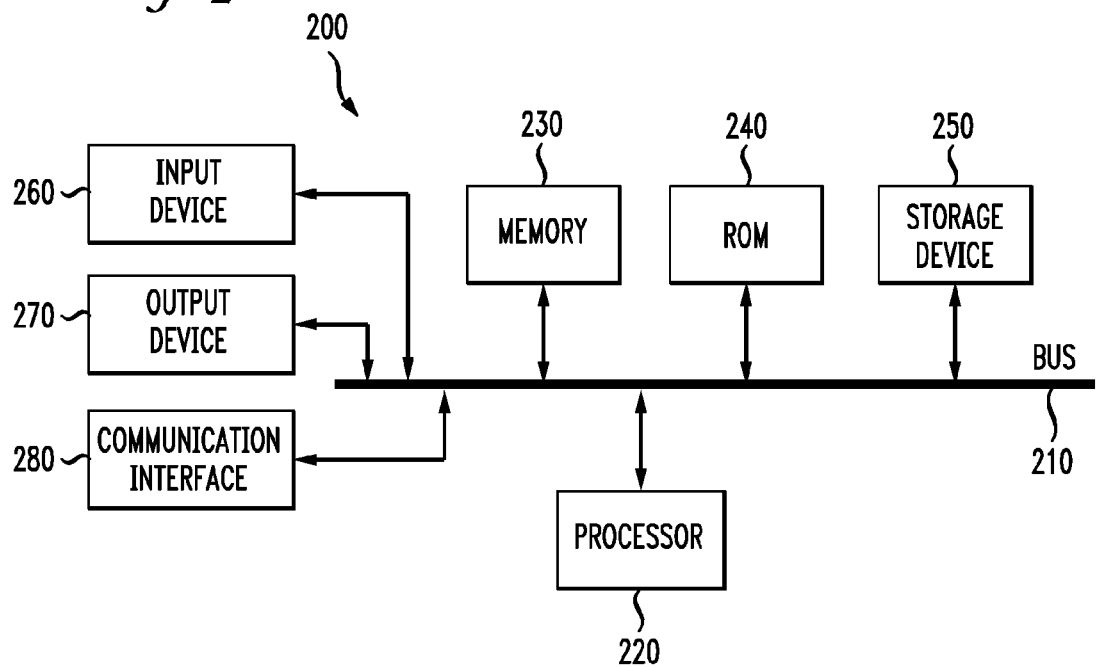
FIG. 2 illustrates an exemplary processing system that may be used to implement one or more components of the system of FIG. 1.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, a voice recognition device, etc. Output device 270 may include one or more conventional mechanisms that output information to the user, including a display, a printer, one or more , or a medium, such as a memory, or a magnetic or optical disk and a corresponding disk drive. Communication interface 280 may include any transceiver-like mechanism that enables system 200 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

System 200 may perform functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Training

FIG. 3 is a flowchart that helps to explain an exemplary process that may be used to train an ASR module, such as, for example, ASR module 102, in an implementation consistent with the principles of the invention. The exemplary process assumes that the speech being processed is provided with matching lexical transcriptions, which, during training, may be oracle transcriptions.

In the exemplary process, training data may be separated into speaker specific segments (act 302), so that the data for each speaker may be processed separately. Next, using a baseline model, ASR module 102 may generate spectral data (act 304). The spectral data may include some representation of the short term magnitude spectrum, with mel-fiterbank cepstral representation, which is well known to those of ordinary skill in the art. The spectral representation may then be generated with warping of the spectral axis using different warping factors (act 306). For example, in one implementation, a range of warping factors may be used from contracting the spectrum by a factor of 0.8 to expanding the spectrum by a factor of 1.2. In one implementation, a step, such as, for example, 0.02, may be used resulting in a total of 21 discrete warping factors. In other implementations consistent with the principles of the invention, other warping factors and other step sizes may be used. Next, ASR module 102 may determine the goodness of a match between a generic speech model and the different generated spectral warps, thus finding the warp or VTLN factor that is the best match (act 308). This may be achieved by forced alignment of the speech model and the speech transcriptions, similar to a process used in building the model.

Having found the best scoring warp, the data generated with the best scoring warp may be preserved for training of acoustic models (act 310). Acts 304-310 may then be repeated for each of the speakers. All of the training data or utterances from each speaker may be used to calculate and determine the best matching warping factor for each speaker. ASR module 102 may determine whether data from other is available (act 312). If so, ASR module 102 may then use all of the available speech from the next speaker to compute warping factors, and may then find the warping factor that best matches the generic model (acts 304-310). After processing all of the speech from each of the speakers, a new acoustic model may be generated. Acts 304-312 may be repeated using the latest generated acoustic model instead of the baseline model until the best matching or estimated warping factor is stable. This may require about four to five iterations. In other words, act 314 may be performed four to five times before the estimated warping factor becomes stable and the procedure is completed.

In another implementation consistent with the principles of the invention, after each iteration of estimating a new VTLN or warping factor for each speaker, the last best warping or VTLN factor for the respective speaker may be compared with the latest calculated best warping or VTLN factor for the speaker. If the warping or VTLN factor does not change or the difference in warping or VTLN factors is less than a predetermined amount, for example, 0.02, then no additional iterations of estimating the VTLN or warping factor may be performed for the speaker.

Speech Recognition

Figure 4A:
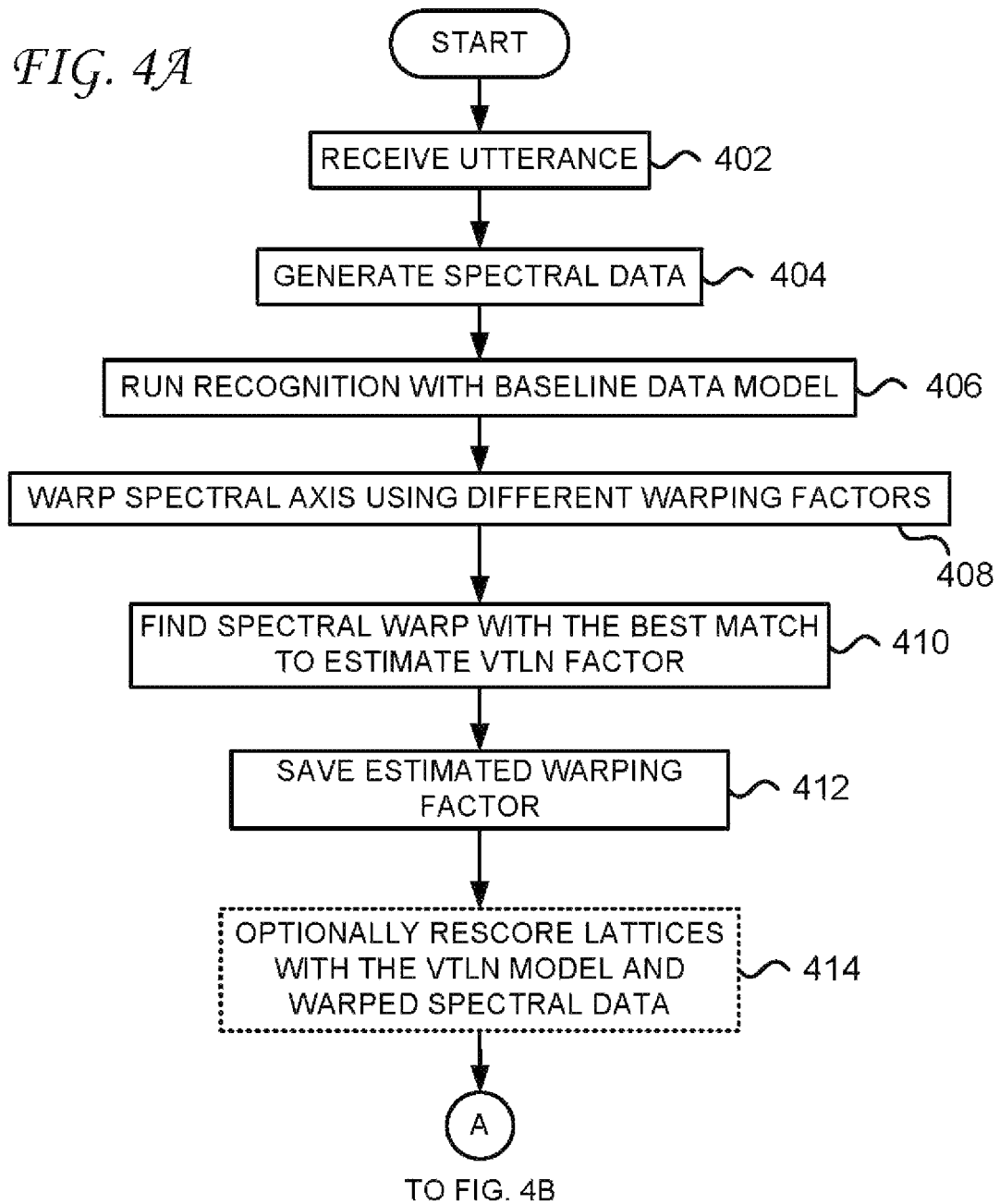

FIGS. 4A and 4B illustrate an exemplary procedure for estimating VTLN factors during speech recognition for a speaker. The exemplary process assumes that a VTLN acoustic model was generated during the training phase. For example, the exemplary training process described above may have been used with the training data for the speaker. The process may begin with ASR module 102 receiving an utterance or a predetermined amount of speech from the speaker (act 402). The predetermined amount of speech may be 30 seconds of speech or another amount. Next, ASR module 102 may generate spectral data from the received speech (act 404). ASR model 102 may then perform speech recognition on the received speech using the baseline data model to generate a best hypothesis (act 406). ASR module 102 may then generate a spectral representation with different warping factors, such as 0.8 to 1.2, with steps of 0.02 (act 408). Other ranges and steps may be used in other implementations. ASR module 102 may then find the spectral warp that best matches a most likely hypothesis determined by ASR module 102 during speech recognition (act 410) and may save the estimated warping factor (act 412). At this point, ASR module 102 may optionally rescore lattices using the VTLN model and the best-match warped spectral data (act 414).

ASR module 102, may then receive a next utterance or predetermined amount of speech from the speaker (act 416; FIG. 4B). ASR module 102 may then perform speech recognition on the utterance using the VTLN model and the estimated best warp from the previous utterance (act 418). ASR module may then determine whether the estimated warping factor is stable (act 420).

In one implementation, ASR module 102 may make the stability determination by determining whether a predetermined amount of speech from the speaker has already been processed and a difference between a latest determined warping factor and a previously determined warping factor is less than a predetermined amount. The predetermined amount of speech may be, for example, 30 seconds, 3 minutes, or any other amount of speech from the speaker and the predetermined difference between the latest determined warping factor and the previously determined warping factor may be less than, for example, 0.02 or another amount.

If the estimated warping factor is stable, then acts 416-420 may be repeated. Otherwise, ASR module 102 may then use full-searching, may generate a range of spectral warps using the range and steps used during act 408 (act 422), and may find the spectral warp that best matches the current utterance and all previous utterances from the speaker (act 424). ASR module 102 may then save the best matching warping factor, and may determine whether the estimated warping factor is stable (act 426).

Optionally, the lattices may be rescored (act 428). A check may then be performed to determine whether any additional utterances from the speaker remain to be processed (act 430). If there are no additional utterances from the speaker, then processing for the speaker is complete. Otherwise, acts 416-430 may be repeated.

In implementations in which the speech is interactive speech, such as a human-machine dialog, the VTLN calculations performed during speech recognition may be performed during the generation of machine-produced speech. Thus, latency, if any, resulting from performing VTLN calculations may be less noticed. Further, once ASR module 102 determines that additional VTLN calculations are not to be performed for additional speech from the speaker, any latency resulting from performing VTLN calculations may be eliminated from that point forward.

Experimental Setup

Several recognition experiments have been conducted to investigate the amount of data required to reliably estimate the VTLN factors, both when large and small amounts of data per speaker were available for training the acoustic models. The experiments were performed using two different training databases, one internal, the other external—Conversational Telephone Speech (CTS, also known as Switchboard and LVCSR). In both cases, the acoustic models used state-tied three-state left-to-right triphonic Hidden Markov Models (HMMs) with 60-dimensional feature vectors generated from nine consecutive 13-dimensional mel-filterbank cepstra transformed using Linear Discriminant Analysis (LDA) and a single semi-tied covariance. The baseline and VTLN versions of the models, for a given task, were very similar in size and type, the only difference was whether the training data was warped or not.

In all the experiments VTLN factors were estimated by forced alignment of the available lexical transcriptions using the VTLN models, and comparing log-likelihoods of the transcriptions. All silence and noise HMM states and all the states neighboring the silence and noise states were excluded, and the scores were normalized by the number of frames represented by the selected HMM states. This state selection provided the highest recognition accuracy, when compared to all the states, or all the speech states or only voiced states. The performance difference was small at less than 0.5%, but consistent.

The test sets used in the experiments with the models built on the internal speech databases were all based on the speakers responses to a general question about what the speech based system can do for the speaker, collected in real applications. Three different test sets were used, henceforth referred to as Task 1, 2 or 3. The test set used with the CTS models was the Eval2002 test set from the LVCSR-2002 evaluation.

Experimental Results

Three sets of experiments were conducted to investigate different aspects of the low latency real time VTLN implementation. One set of experiments concentrated on the effects of reducing the amount of available data to estimate the warps during recognition. The next set of experiments reduced the amount of training during the training phase as well. The final set of experiments compared two extremes in possible real time implementations of the VTLN algorithm in a commercial product search engine.

VTLN with Reduced Amounts of Training Data

The initial experiments were all performed using the CTS database. There was a large training database with a sufficient amount of speech per speaker, ranging from about half a minute to ten minutes. The test set similarly had a significant amount of speech per speaker. Two models were used in the experiments, the baseline model and a VTLN trained model, trained in 5 iterations of warp estimation and cepstral re-generation and relative to using all the available data. In the first experiment, the effect of reducing the amount of available speech for estimating the warps during the recognition phase was evaluated. The model did not change and was always trained with warp estimation utilizing all the available data for every speaker. The baseline model was used to generate rescoring lattices and recognition hypothesis. Both the first pass, generating the lattices, and the second pass, rescoring the lattices, were run with sufficiently wide beams to prevent significant search errors. The hypotheses were used with forced alignment with all 21 sets of cepstra generated with 21 different warps. Starting from the beginning of the available data for each speaker, the amount of data used to estimate the warp was increased in subsequent experiments starting with 0.5 seconds, up to 3 seconds, and also including all the available data. The recognition Word Error Rates (WER) for each length of speech used to estimate the warps is shown in FIG. 5. FIG. 5 includes, as the performance limits, the error rate of the baseline model and the VTLN model that used all the available data to estimate the warps.

It is important to note that most of the test data was not included in the calculation of the warps, other than for the limiting case, and, in fact, it completely dominated the recognition performance (all the data minus the short segment used to estimate the warps). The significance of this was realized when the utility of an estimated warp was evaluated for use in recognizing previously unseen speech. Unlike acoustic model adaptation, in which self-adaptation is very important, rescoring the speech on which the model has been adapted provides roughly double the improvement when compared to recognition of the previously unseen speech by the same speaker. VTLN based adaptation does not suffer from such loss in performance.

The results show that even very short segments of speech are sufficient to estimate VTLN factors and achieve significant reduction in error rates overall. Another area for investigation was whether VTLN based adaptation can hurt performance of individual speakers.

Figure 6:
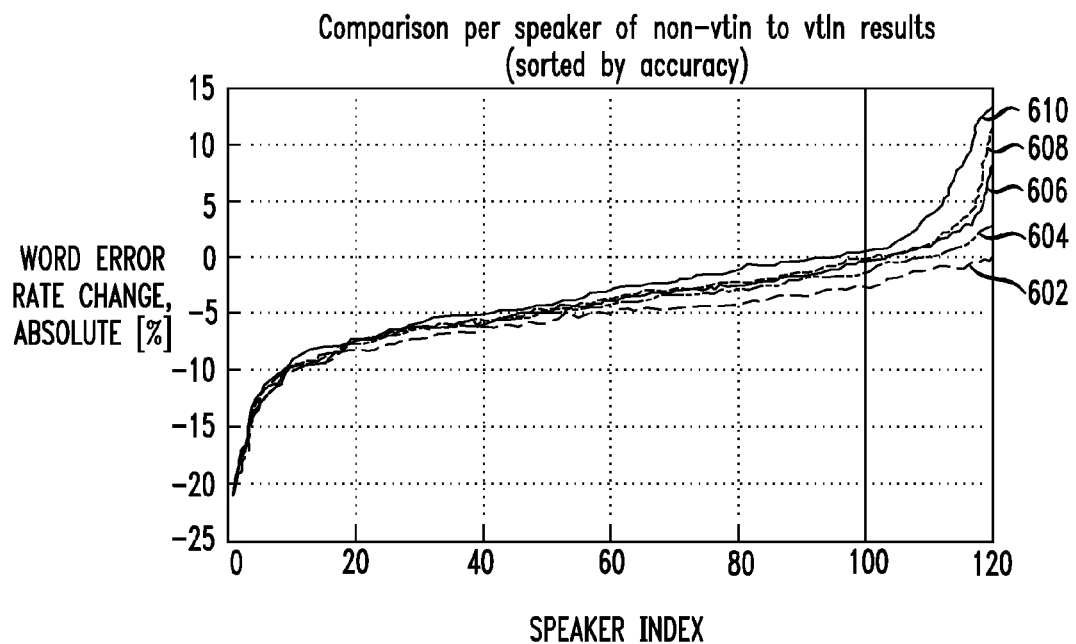

FIG. 6 shows a change in word error rate for all the speakers, when compared to the performance of the baseline model. Once the change in word error rate was computed, the scores were sorted from highest reduction to lowest reduction/highest increase in error rate. This was done independently for each experiment with different amounts of data to use for estimating the warps. Plot 602 corresponds to the change in word error rate when all of the available data us used to estimate the warps during recognition, plot 604 corresponds to the word error rate change when 3.0 seconds of speaker data were used, plot 606 corresponds to the word error rate change when 2.0 seconds of speaker data were used, plot 608 corresponds to the word error rate change when 1.0 second of speaker data was used, and plot 610 corresponds to the word error rate change when 0.5 seconds of speaker data was used.

When all of the available data for a speaker was used to estimate the warp, there was never a loss in performance for individual speakers (WER change less than 0, see plot 602 of FIG. 6), although the number of speakers whose WER increased grew as less and less data was used to estimate the warp. As will be discussed below, some of the loss in performance is random and not directly related to the estimation itself.

Figure 7:
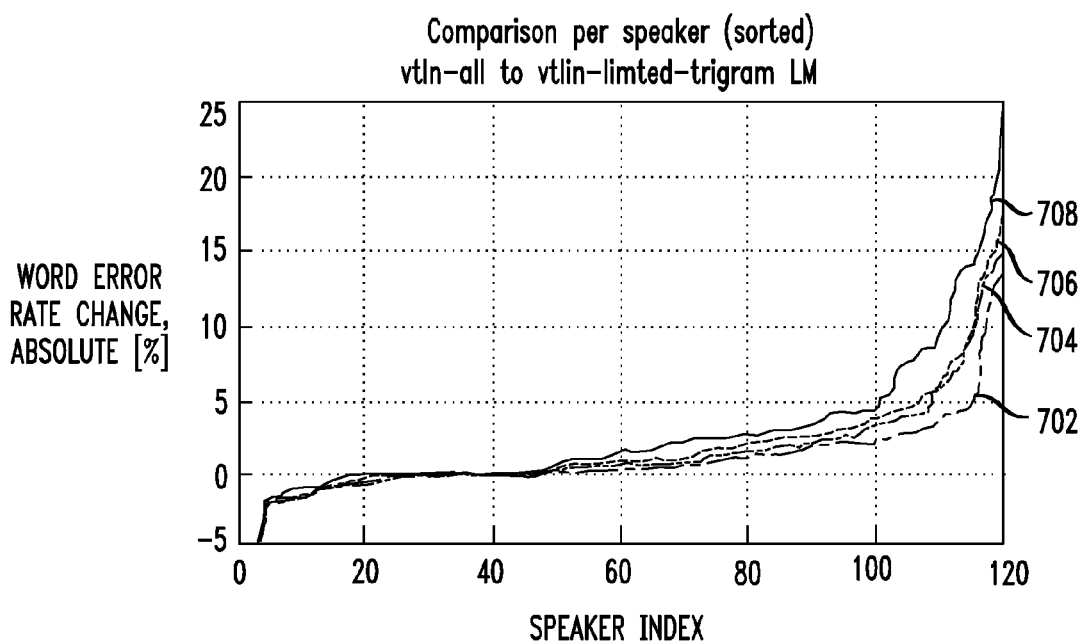

FIG. 7 shows the change in WER as less and less data is used for estimating the warps, when compared to using all the data. Plot 702 corresponds to the word error rate change when 3.0 seconds of speaker data were used, plot 704 corresponds to the word error rate change when 2.0 seconds of speaker data were used, plot 706 corresponds to the word error rate change when 1.0 second of speaker data was used, and plot 708 corresponds to the word error rate change when 0.5 seconds of speaker data was used.

Figure 8:
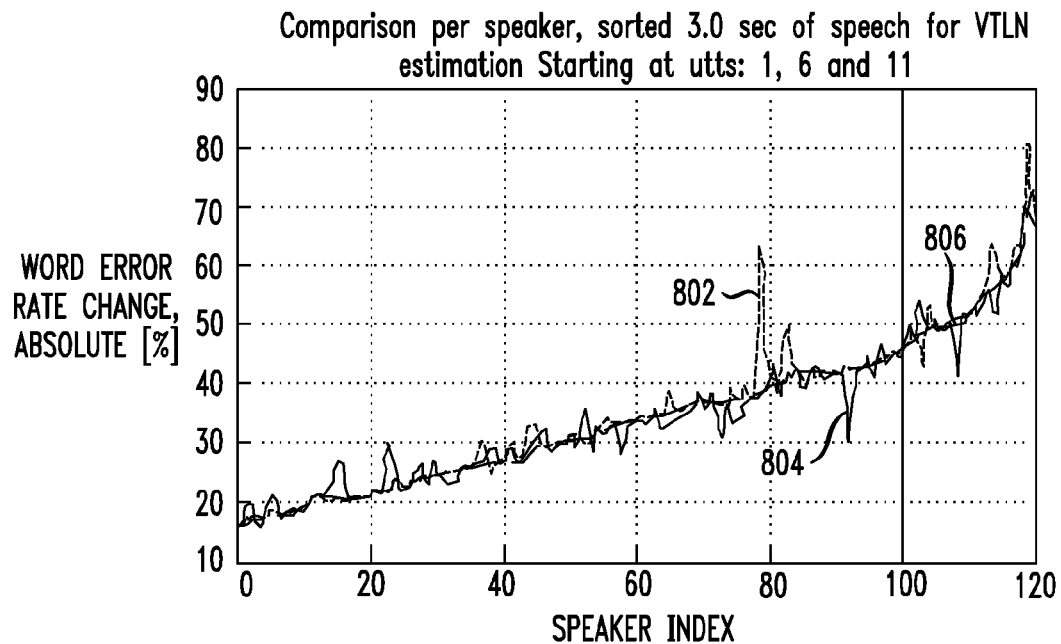

The results shown in the plots of FIGS. 6 and 7 were based on taking an initial speech segment of varying lengths. In another set of experiments, a difference in speech recognition performance, when different speech segments of identical length are used for VTLN estimation, were compared in order to estimate the significance of selecting the best short segment. The results are shown in FIG. 8, where the reference curve plot 806) corresponds to the 3.0 sec segment warp estimate starting at the beginning of the first utterance by a given speaker, sorted by decreasing word accuracy. Plots 804 and 806 provide the word accuracies when the warp estimation is based on speech segments starting at the beginning of the sixth plot 804) and the eleventh utterances (plot 802). The differences are small and can be both positive and negative. This confirms that maximizing likelihood of the HMM based acoustic models does not necessarily maximize recognition accuracy.

VTLN with Reduced Amount of Training and Testing Data

Figure 9:
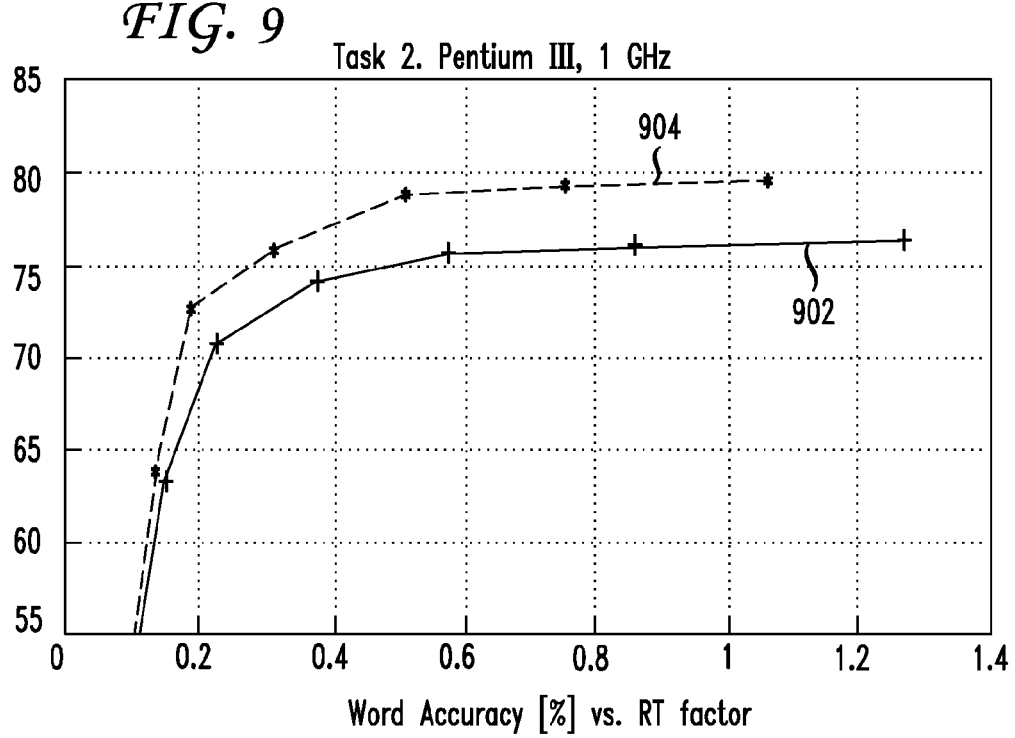

The following experiments were conducted using proprietary databases, both for training and testing. The training data consisted of approximately 200 hours of speech and the test databases were each about 5500 utterances long. Unlike the CTS experiments, there is no speaker labeling in the databases. Thus, each utterance was considered as being spoken by a different speaker, both during training and testing. Also, since the models generated in this case were meant for real services, faster than real-time performance was very important. The performance is not evaluated as a single point specifying the word accuracy, but as a curve showing the relationship between speed and word accuracy. The general type of application envisioned for these models was a multiple turn human-machine interaction, in which a human user performed a task which may be information extraction or completion of various actions. The experimental setup was somewhat contrived for convenience. The first pass used a full search to generate a single hypothesis. Next, the best scoring warp was found and the matching cepstra were preserved. Finally, a VTLN trained model was used with full search to re-recognize the utterance. The first pass was always run at a beam used in real life services, such as 10. The second pass was run with the full range of beams. This set of results was compared with the full search of the baseline model when run through the full range of beams, in order to facilitate comparison of the performance curves. FIG. 9 shows the performance improvement after VTLN warping of the data using the VTLN trained acoustic model. Plot 902 shows performance of the baseline model and plot 904 shows performance of the VTLN trained acoustic model.

Figure 10:
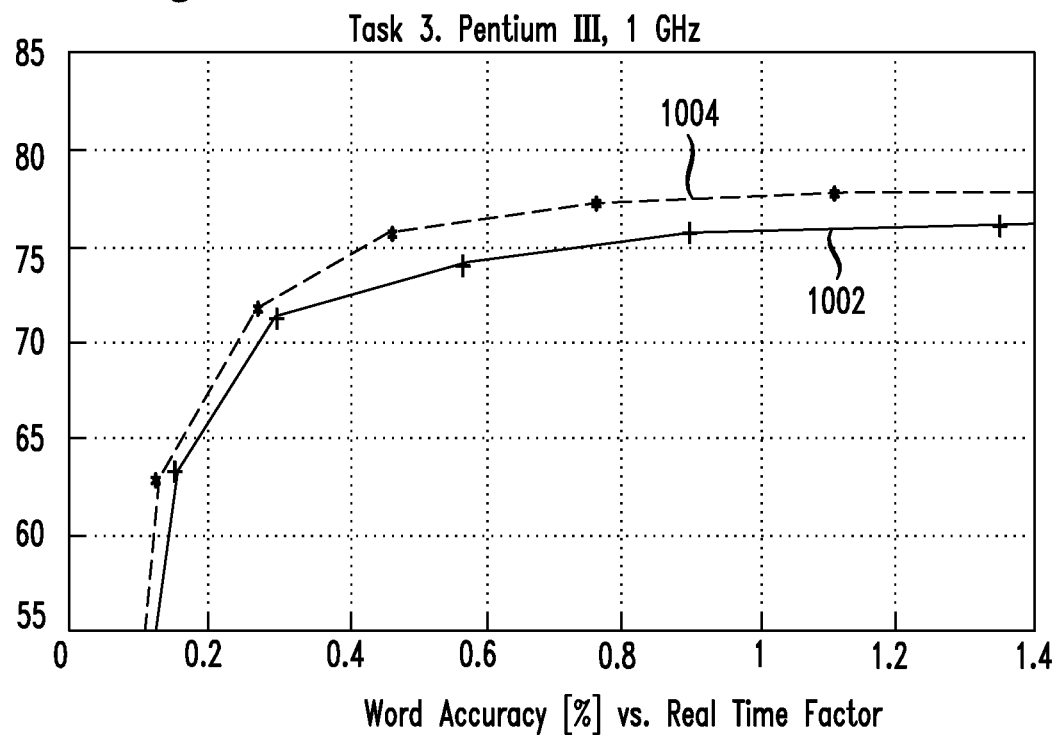

Similar, although lower magnitude improvements were achieved using the same VTLN model on Task 3, as shown in FIG. 10. Plot 1002 shows performance using the baseline model, while plot 1004 shows performance using the VTLN-trained model. It should also be noted that less than 5% of the training data comes from the tasks 2 and 3, while the rest comes from other, older tasks. The final experiments were conducted using a commercial search engine, unlike the previous experiments which used a research search engine.

Low Latency Implementations of VTLN

Next, the performance of two different approaches to real-time implementation of VTLN were investigated. Given that in commercial applications speed is almost as important as accuracy, the complete performance curves for evaluation of the two algorithms were plotted.

Some initial speech was recognized and processed for warp estimation. The likelihood accumulators for each warp can continuously be updated as additional speech arrives, but can be suspended at any time when it is deemed that the estimates are sufficiently stable. This can be at the end of the first utterance, or at any time, even in the middle of an utterance. Additional flexibility allowed for preserving a VTLN estimate and suspending the use of the baseline model and instead using the VTLN model for the full search, thus achieving zero latency. Also, in cases in which a small amount of latency can be tolerated, rescoring can be applied at any time. This would also allow a change in speech normalization from having a very short look ahead to batch. This includes normalizations like cepstral mean subtraction and energy peak normalization.

Only two of a myriad of possible configurations were investigated, the simplest, scenario A, and the slowest, scenario B. Neither is probably optimal as a realistic scenario, but they provide a good feel for the performance limits. Performance using the baseline model is shown in plot 1104, performance using the VTLN-Task A model is shown in plot 1106, and performance using the VTLN-Task B model is shown in plot 1102.

Because the test data included only a single utterance per speaker, a more realistic human-machine interaction was approximated by using two copies of the same utterance as a simulated conversation. Using the simple scenario, A, the first utterance was recognized with the baseline model and the best hypothesis was used to estimate the speaker's optimal spectral warp. In order to not incur a latency penalty, no rescoring or re-recognition with the VTLN model was performed. Subsequent utterances were then recognized with the VTLN model and the previously estimated VTLN factor. In this case the subsequent utterances were the single copy of the initial utterance. This scenario's apparent performance improvement is due only to the improvement on the subsequent utterances. When the subsequent utterances combined are much longer than the initial utterance, the improvement doubles.

Figure 11:
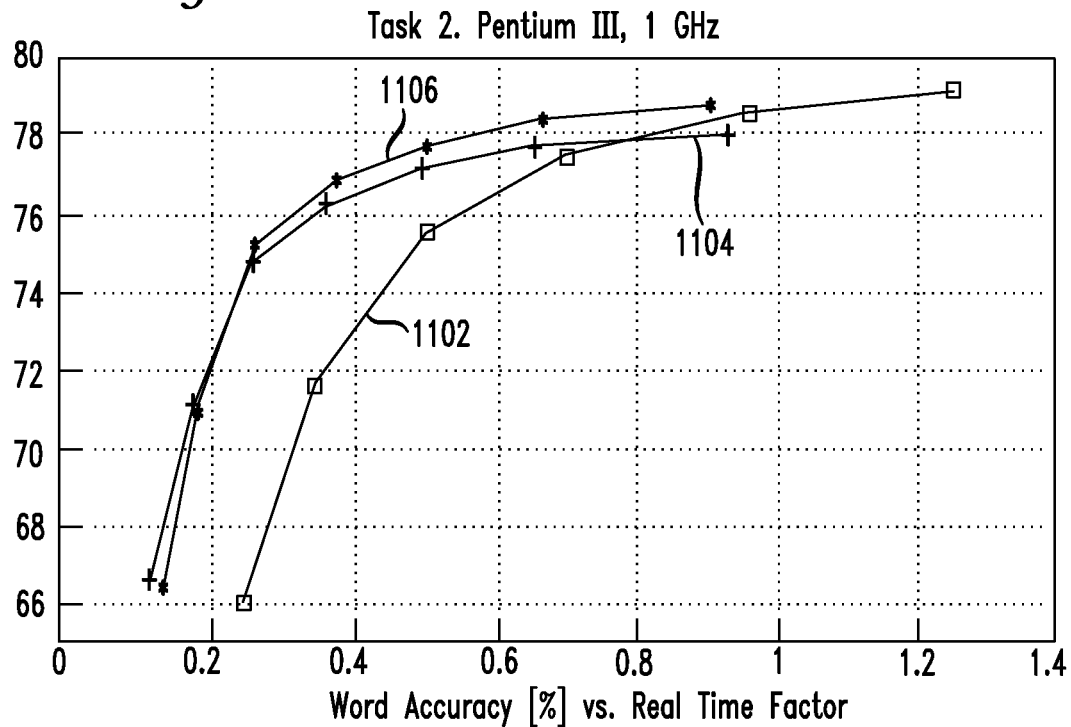

The second configuration, B, starts in a similar fashion. The baseline model was used to generate a hypothesis, which is in turn was used to estimate the best warp. A major latency/speed penalty was incurred by re-recognizing, using full search, with the VTLN model. This effectively doubled the processing time, and it did not exploit an opportunity to use batch speech normalizations. The recognition results are shown in FIG. 11 for Task 2 and in FIG. 12 for Task 3. In FIG. 12, plot 1204 shows the results using the baseline model, plot 1206 shows the results using the Task A model, and plot 1202 shows the results using the Task B model.

It is clear that Task B has the potential for much higher accuracies, but at the expense of long latencies and processing times. It is, however, likely that a combination of lattice rescoring and batch normalizations could provide the speed and latency approaching Task A, with accuracy that even surpasses the accuracy of Task B.

Conclusions

The experimental results clearly demonstrate the feasibility of using a VTLN algorithm for low latency real-time recognition in commercial applications. Short speech segments can be successfully used to reliably estimate speaker specific spectral warps. In the CTS experiments, this was true even when a mismatch was created between training and testing data because during training all of the available speech was used to estimate the warps, but during testing only short fragments were used. When the amount of available speech per speaker was minimized to only a single utterance, the difference between the baseline and VTLN trained models was reduced, because the reliability of the warp estimate was reduced. Nevertheless, the VTLN trained model still provided significant performance improvements when compared to the baseline model. A choice has to be made, when matching the training and testing conditions, to select the appropriate length of speech to use to estimate the warps. The longer the speech, the more accurate the estimate and the better the model. However, much speech has to be processed before the test warp can be estimated, or a mismatch penalty will be paid if using less speech in testing than in training. This would suggest the preclusion of the use of the VTLN model during the initial test utterances until a suitable length of speech is accumulated. The warps in both training and testing should not be estimated using only one utterance because many of the utterances are quite short. However, it is clear that using VTLN for real-time low latency applications is possible and desirable.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. Tangible computer-readable storage media expressly exclude media such as energy, carrier signals, electromagnetic waves, and signals per se.

Computer-executable instructions include, for example, instructions and data which cause a general purpose computer, special purpose computer, or special purpose processing device to perform a certain function or group of functions.

Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, some implementations consistent with the principles of the invention may include an Application Specific Integrated Circuit (ASIC) or may include hard-wired logic instead of, or in addition to one or more conventional processors. Further, implementations of the invention may include processing that varies from the acts of FIGS. 3-4B. For example, the order of the acts may vary and some of the acts, themselves may differ in some implementations. Accordingly, the appended claims and their legal equivalents should only define the invention, rather than any specific examples given.

We claim:

1. A method comprising:
    separating training data into speaker specific segments;
    performing, for a speaker specific segment of the speaker specific segments:
        generating spectral data representative of the speaker specific segment, the spectral data comprising a plurality of warping factors;
        selecting a first warping factor as a best warping factor from the plurality of warping factors based on a determination made during speech recognition of the speaker specific segment, and generating a warped spectral data representation of the spectral data using the first warping factor;
        comparing the warped spectral data representation to a vocal tract length normalized acoustic model;
        iteratively carrying out, until a comparison indicates a warping factor difference below 0.02, the acts of:
            selecting an other warping factor and generating an other warped spectral data representation;
            comparing the other warped spectral data representation to the vocal tract length normalized acoustic model, to yield the comparison; and
            when the other warping factor produces a closer match to the vocal tract length normalized acoustic model, saving the other warping factor as a best warping factor for the speaker specific segment;
    training a new acoustic model using a warped spectral data representation of all the training data that is generated using the best warping factor for each of the speaker specific segments;
    selecting the new acoustic model as the vocal tract length normalized acoustic model; and
    repeating the steps of performing and selecting until the best warping factor for each of the speaker specific segments is stable.

2. The method of claim 1, wherein the plurality of warping factors have a range from about 0.8 to about 1.2.

3. The method of claim 2, wherein the range comprises increments of about 0.02 between each warping factor.

4. The method of claim 1, wherein the end condition comprises a predetermined amount of total speech having been used to select the best warping factor.

5. The method of claim 1, wherein the end condition comprises a difference between a latest warping factor and a preceding warping factor being smaller than a predetermined amount.

6. The method of claim 1, wherein the spectral data is a short-term magnitude spectrum of the speaker specific segment.

7. The method of claim 1, wherein the spectral data comprises a spectral axis modified by the warping factor.

8. The method of claim 7, wherein the new acoustic model comprises a vocal tract length normalized acoustic model based on the spectral axis modified by the warping factor.

9. The computer-implemented method of claim 1, wherein the vocal tract length normalized acoustic model is initially a generic acoustic model.

10. A system comprising:
    a processor; and
    a computer-readable storage medium having instructions stored which, when executed by the processor, cause the processor to perform operations comprising:
        separating training data into speaker specific segments;
        performing, for a speaker specific segment of the speaker specific segments:
            generating spectral data representative of the speaker specific segment, the spectral data comprising a plurality of warping factors;
            selecting a first warping factor as a best warping factor from the plurality of warping factors based on a determination made during speech recognition of the speaker specific segment, and generating a warped spectral data representation of the spectral data using the first warping factor;
            comparing the warped spectral data representation to a vocal tract length normalized acoustic model;
            iteratively carrying out, until a comparison indicates a warping factor difference below 0.02, the acts of:
                selecting an other warping factor and generating an other warped spectral data representation;
                comparing the other warped spectral data representation to the vocal tract length normalized acoustic model, to yield the comparison; and
                when the other warping factor produces a closer match to the vocal tract length normalized acoustic model, saving the other warping factor as a best warping factor for the speaker specific segment; and
        training a new acoustic model using a warped spectral data representation of all the training data that is generated using the best warping factor for each of the speaker specific segments; selecting the new acoustic model as the vocal tract length normalized acoustic model; and repeating the steps of performing and selecting until the best warping factor for each of the speaker specific segments is stable.

11. The system of claim 10, wherein each the plurality of warping factors have a range from about 0.8 to about 1.2.

12. The system of claim 11, wherein the range comprises increments of about 0.02 between each warping factor.

13. The system of claim 10, the computer-readable storage medium having additional instructions stored which result in the operations further comprising rescoring the lattices based on the selected ones of the plurality of warped spectral axes.

14. The system of claim 10, the computer-readable storage medium having additional instructions stored which result in the operations further comprising determining when the selected ones of the plurality of warped spectral axes are stable.

15. The system of claim 10, the computer-readable storage medium having additional instructions stored which result in the operations further comprising iteratively performing:

selecting an other warping factor and generating an other warped spectral data representation based on the respective warped spectral axes;

comparing the warped spectral data representation to the vocal tract length normalized acoustic model for a given iteration; and when the other warping factor produces a closer match to the vocal tract length normalized acoustic model, saving the other warping factor as a best warping factor for the respective speaker specific segment.

16. The system of claim 15, wherein the end condition comprises a predetermined amount of total speech having been used to select the best warping factor.

17. The system of claim 15, wherein the end condition comprises a difference between a latest warping factor and a preceding warping factor being smaller than a predetermined amount.

18. A computer-readable storage device having instructions stored which, when executed by a computing device, cause the computing device to perform operations comprising:

separating training data into speaker specific segments;

performing, for a speaker specific segment of the speaker specific segments:

generating spectral data representative of the speaker specific segment, the spectral data comprising a plurality of warping factors;

selecting a first warping factor as a best warping factor from the plurality of warping factors based on a determination made during speech recognition of the speaker specific segment, and generating a warped spectral data representation of the spectral data using the first warping factor;

comparing the warped spectral data representation to a vocal tract length normalized acoustic model;

iteratively carrying out, until a comparison indicates a warping factor difference below 0.02, the acts of:

selecting an other warping factor and generating an other warped spectral data representation;

comparing the other warped spectral data representation to the vocal tract length normalized acoustic model, to yield the comparison; and when the other warping factor produces a closer match to the vocal tract length normalized acoustic model, saving the other warping factor as a best warping factor for the speaker specific segment; and training a new acoustic model using a warped spectral data representation of all the training data that is generated using the best warping factor for each of the speaker specific segments; selecting the new acoustic model as the vocal tract length normalized acoustic model; and repeating the steps of performing and selecting until the best warping factor for each of the speaker specific segments is stable.

* * * * *